United States Patent [19]

Schwab

[11] Patent Number: 4,523,717
[45] Date of Patent: Jun. 18, 1985

[54] ANIMAL TRAIL MARKER AND SCENT CONTAINER

[76] Inventor: Richard J. Schwab, 120 Monroe St., Mauston, Wis. 53948

[21] Appl. No.: 556,591

[22] Filed: Nov. 30, 1983

[51] Int. Cl.³ .................................... A01N 25/00
[52] U.S. Cl. .................................... 239/56; 239/58; 43/2; 43/131; 206/225; 220/20; 242/137.1; D22/18; D22/19
[58] Field of Search .......... 239/52, 53, 55–59; 43/2, 124, 131; 206/225–227, 315.11; D22/18, 19; 215/6; 220/20, 315, 327; 242/137.1

[56] References Cited

U.S. PATENT DOCUMENTS

| | | | |
|---|---|---|---|
| 2,959,354 | 11/1960 | Beck | 239/55 |
| 3,119,650 | 1/1964 | Bilyeu | 43/124 |
| 3,144,152 | 8/1964 | Kopp | 220/20 |
| 3,966,085 | 6/1976 | Norton | 220/327 |

Primary Examiner—Andres Kashnikow
Assistant Examiner—James R. Moon, Jr.
Attorney, Agent, or Firm—Harvey B. Jacobson

[57] ABSTRACT

An elongated sleeve member is provided having a central internal partition intermediate the opposite ends thereof and dividing the interior into opposite end endwise outwardly opening cavities. A first cap is provided for one end of the sleeve member and includes a central inwardly projecting threaded shank. The partition includes a central threaded bore through which the threaded shank is threadedly engaged and the first cap may contain an animal scented body supported therefrom for tight closure within the corresponding sleeve member end cavity when the first cap is tightly threaded into closed engagement with the corresponding sleeve member end. The threaded shank projects through the partition and into the opposite end cavity when the first cap is fully closed and a second cap is provided for the other end of the sleeve member and includes a central inwardly projecting, externally smooth and cylindrical shank provided with a threaded blind bore in which the threaded shank is threadingly received. A thread spool is journalled on the shank of the second cap and is of a length slightly greater than the length of the associated cavity, whereby the second cap may be tightened on the threaded shank to clamp the spool within the associated cavity against rotation therein. That portion of the sleeve member defining the thread spool receiving cavity includes a radial bore through which the free end portion of the thread on the spool may extend to the exterior of the sleeve member.

10 Claims, 4 Drawing Figures

ANIMAL TRAIL MARKER AND SCENT CONTAINER

BACKGROUND OF THE INVENTION

Many different persons including hunters, wild life management persons and naturalists often have a need for marking the routes they walk, determining movement of game along game trails and exposing animal scent material to attract various animals.

Different forms of containers including some of the general structural features of the instant invention heretofore have been provided such as those disclosed in U.S. Pat. Nos. 1,081,070, 1,476,604, 1,721,215, 2,395,006, 2,458,898, 2,667,009, 2,959,354, 3,049,227 and 3,119,650.

However, these previously known forms of containers, for the most part, are not designed in a manner to provide an apparatus which is readily usable both as a trail marker and as a scent container and wherein separate trail marking thread and scent compartments are provided and independently usable. Accordingly, a need exists for an improved combined trail marker and scent container.

BRIEF DESCRIPTION OF THE INVENTION

The combined trail marker and scent container of the instant invention includes an elongated sleeve member having a central internal partition dividing the interior of the container into opposite end outwardly opening cavities. A closure cap is provided for one end of the sleeve member and includes a central threaded shank threadingly engaged through a threaded bore formed in the center of the aforementioned partition. The shank equipped cap is designed to support animal scented material and may be tightly closed when the animal scented material is not in use. A second cap is provided for the other end of the sleeve member and includes a smooth cylindrical shank having a threaded blind bore formed therein. The second cap is threadedly engaged upon the end portion of the threaded shank which projects through the partition and the blind bore equipped shank rotatably journals a line spool thereon of an axial length slightly greater than the length of the cavity in which it is received whereby the second end cap may be tightened on the shank to clamp the line spool against rotation relative to the sleeve member. One portion of the outer wall of the sleeve member defining the line spool receiving cavity includes a radial bore formed therein through which the free end of a line wound on the spool may extend and the second cap includes an apertured ear through which a suspension line may be secured.

The end caps may be separately loosened relative to the sleeve member due to the fact that the threaded shank on the first end cap is threaded not only through the partition but also in the blind bore equipped shank of the second cap. In this manner, either the marking line or animal scented material in the opposite ends of the sleeve member may be used when desired.

The main object of this invention is to provide a combined animal trail marker and scent container which will enable trail marking thread or animal scent to be independently used.

Another object of this invention is to provide an apparatus in accordance with the preceding object and constructed in a manner whereby use of either the marking thread or line and the animal scent therein may be readily effected.

Still another important object of this invention is to provide a combined trail marker and scent container which may be readily carried in a pocket or pinned in place to a piece of clothing.

A further object of this invention is to provide a combined trail marker and scent container which may be readily used by various different persons who on occasion walk through woods.

A final object of this invention to be specifically enumerated herein is to provide a combined trail marker and scent container in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
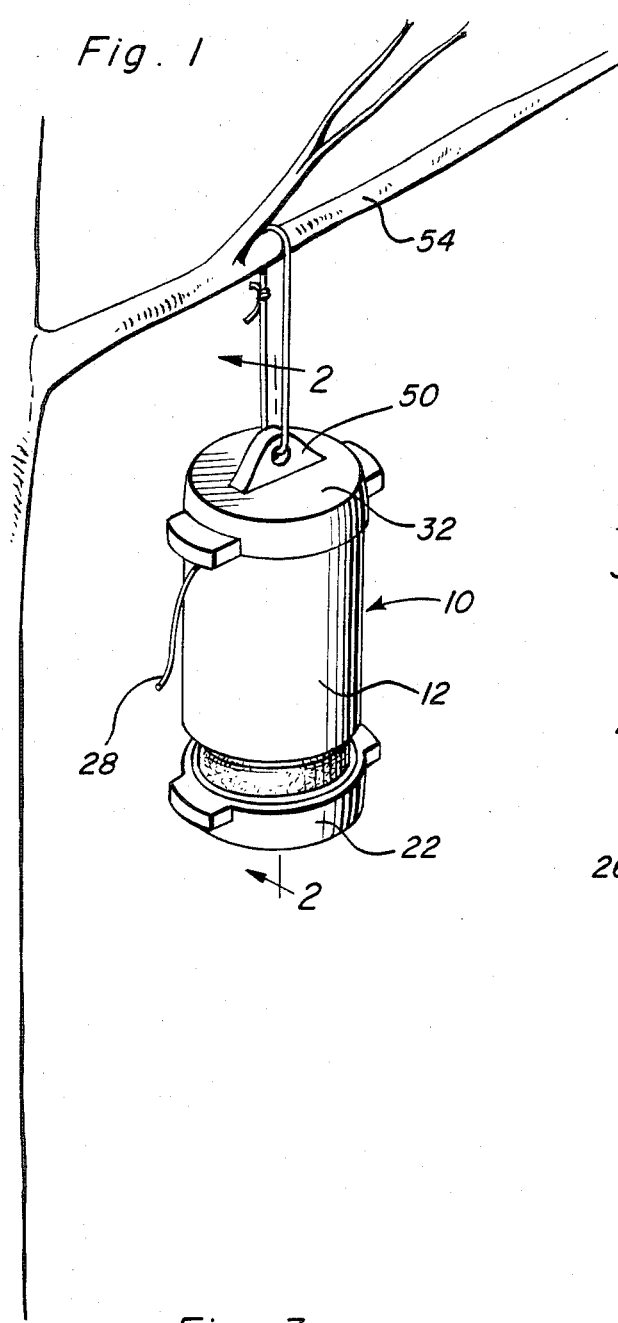
FIG. 1 is a perspective view of the combined trail marker and scent container illustrated suspended from a tree branch and with the scented material end of the container in an open position.
Figure 2:
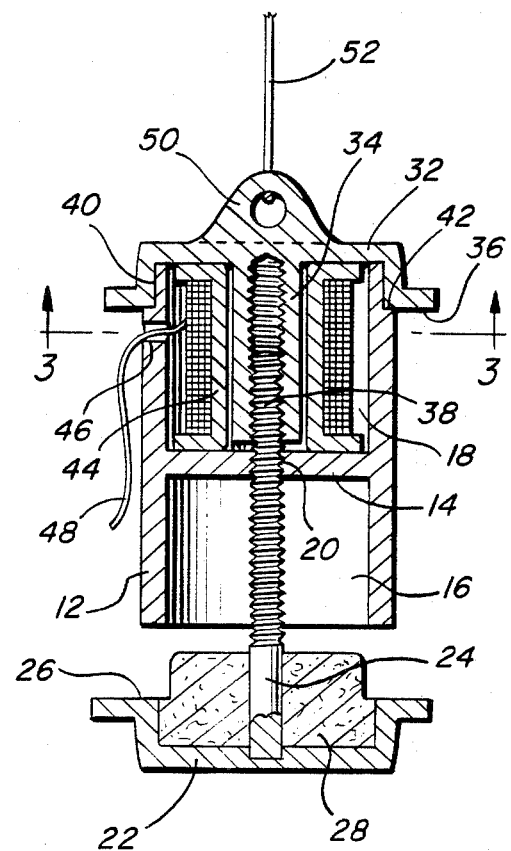
FIG. 2 is an enlarged vertical sectional view taken substantially upon the plane indicated by the section line 2—2 of FIG. 1.
Figure 3:
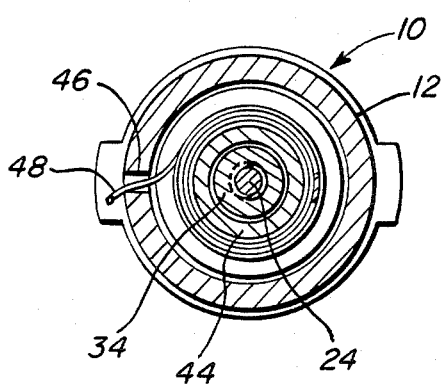
FIG. 3 is a horizontal sectional view taken substantially upon the plane indicated by the section line 3—3 of FIG. 2.
Figure 4:
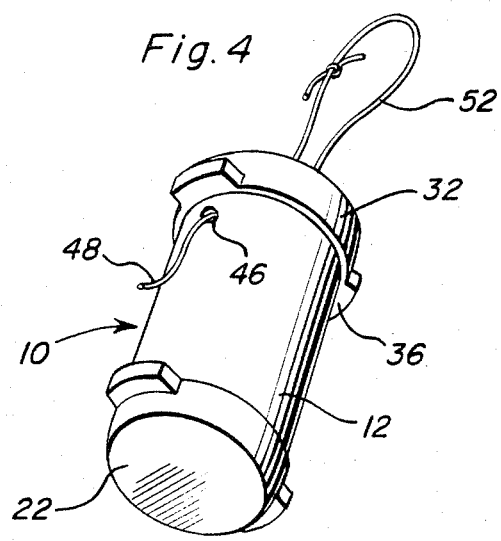
FIG. 4 is a perspective view of the trail marker and scent container in a fully closed position.

Referring now more specifically to the drawings the numeral 10 generally designates the combined trail marker and scent container of the instant invention. The container 10 includes an elongated sleeve member 12 of cylindrical configuration and including a central integral transverse partition 14 dividing the interior of the sleeve member 12 into opposite and outwardly opening cavities 16 and 18.

The partition 14 includes a central threaded bore 20 formed therethrough and a first end cap 22 is provided and includes a central threaded shank 24 projecting outwardly of the open side 26 of the cap 22. An annular body of absorbent material is disposed within the cap 22 about the shank 24 and may be saturated with a selected animal scent.

The free end of the shank 24 is threaded through the bore 20 and projects considerably into the cavity 18. The end of the sleeve member outwardly through which the cavity 18 opens includes a second end cap 32 having an externally smooth cylindrical shank 34 projecting outwardly of the open side 36 thereof. The shank 34 has a threaded blind bore 38 formed therein and the free end of the shank 24 is threaded in the bore 38.

The end of the sleeve member outwardly through which the cavity 18 opens includes a diametrically reduced terminal end 40 defining an annular shoulder 42 at the inner extremity of the terminal end 40 and the end cap 32 includes an interior of a size to be snugly received over the diametrically reduced terminal end 40. In addition, a line or thread spool 44 is provided and loosely journalled on the shank 34. The thread spool 44 is of an axial length slightly greater than the axial length of the cavity 18, whereby full tightening of the end cap 32 on the threaded shank 24 will axially clamp the spool 44 between the end cap 32 and the opposing side of the partition 14 in order to prevent rotation of the spool 44 within the cavity 18. Further, one side wall portion of the sleeve member 12 includes a radial bore 46 formed therethrough and the free end portion 48 of a line, string, or other flexible member wound on the spool 44 is loosely received through the bore 46.

The outer surface of the second end cap 32 includes an apertured lug 50 through which a suspension line 52 is secured and the suspension line 52 may be utilized to suspend the container 10 from a tree twig 54 or the like, see FIG. 1.

In operation, when it is desired to use the animal scented annular body 28 to attract a particular species of animal, the container 10 may be suspended in the manner illustrated in FIG. 1 or otherwise positioned and supported as desired with the first end cap 22 loosened in order to expose the animal scented annular body 28 to the ambient air. However, when it is desired not to use the animal scented annular body, the end cap 22 may be tightly closed by threading the shank 24 further into the blind bore 38 in order to tightly abut the open end 26 of the cap 22 against the opposing end of the sleeve member 12.

When the marking line or string 48 is not being used, the end cap 32 is tightly threaded on the shank 24 in order to clamp the spool 44 against rotation relative to the sleeve member 12. However, when it is desired to withdraw a length of line or string 48 from the container 10, the end cap 32 is loosened in order to allow free rotation of the spool 44 within the cavity 18 and the outwardly projecting end of the line 48 may be pulled in order to obtain the desired length of line or string.

When the end cap 32 is tightly secured in the closed position, the end cap 22 may be rotated either to close the cap 22 or to open the latter without loosening or tightening the end cap 32, inasmuch as the threaded shank 24 enjoys a threaded connection with the partition 14 as well as the shank 34 and the end cap 32 and sleeve member 12 are frictionally retained against rotation relative to each other.

The line or string 48 may be luminous so as to be visible in the dark and the container 10 may be readily carried in a pocket or pinned to a piece of clothing.

It is believed obvious that the spool 44 of thread 48 may be readily replaced, that a length of thread 48 may extend from the container 10 in order to determine wind direction and that the scented body 28 and thread 48 may be independently or simultaneously used, as desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An animal trail marker and scent container, said container including an elongated hollow sleeve having first and second ends and a central partition dividing the interior of said sleeve into first and second opposite and outwardly opening recesses, said partition having a central threaded bore formed therethrough, first and second caps for removably closing the first and second ends of said sleeve, said first cap including a first central threaded shank projecting through said first recess, threaded through said bore and projecting into said second recess, said second cap including a second central outwardly projecting shank having a blind bore formed therein in which said threaded shank is removably threadingly engaged, a spool removably journalled on said second shank and of an axial length to be clamped between opposing surfaces of said partition and said second cap when disposed within said second recess and said second cap is at least substantially tightly closed, said second end of said sleeve including a lateral opening formed therein opening into said second recess from the exterior of said sleeve, an elongated flexible member having one end anchored relative to said spool and partially wound thereon, the other end of said flexible member extending outwardly through said lateral opening, and animal scent material disposed within said first recess.

2. The container of claim 1 wherein said animal scent material comprises an annular body mounted on said shank.

3. The container of claim 2 wherein said annular body includes an outer peripheral portion engageable with the end face of said first end of said sleeve, said first cap defining an inwardly opening recess in which said annular body is received.

4. The container of claim 1 wherein said second end of said body includes a diametrically reduced end portion, said second cap defining an inwardly opening recess in which said diametrically reduced end portion is received.

5. The container of claim 1 including an outwardly projecting support lug carried by one of said caps.

6. The container of claim 5 wherein said outwardly projecting support lug is carried by said second cap.

7. The container of claim 6 wherein said support lug includes an opening formed therethrough, and a suspension member having a portion thereof secured through said lug opening.

8. The container of claim 6 wherein said animal scent material comprises an annular body mounted on said shank.

9. The container of claim 8 wherein said annular body includes an outer peripheral portion engageable with the end face of said first end of said sleeve, said first cap defining an inwardly opening recess in which said annular body is received.

10. The container of claim 9 wherein said second end of said body includes a diametrically reduced end portion, said second cap defining an inwardly opening recess in which said diametrically reduced end portion is received.

* * * * *